(12) United States Patent
Blanc et al.

(10) Patent No.: US 12,170,391 B2
(45) Date of Patent: Dec. 17, 2024

(54) FUEL CELL SYSTEM AND VALVE FOR REGULATING OXYGEN IN A FUEL CELL SYSTEM

(71) Applicant: Robert Bosch GmbH, Stuttgart (DE)

(72) Inventors: Régis Blanc, Tassin la Demi Lune (FR); Florian Holliger, Vourles (FR); Samuel Robin, Saint-Romain-de-Jalionas (FR)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 18/020,443

(22) PCT Filed: Jul. 19, 2021

(86) PCT No.: PCT/EP2021/070125
§ 371 (c)(1),
(2) Date: Feb. 9, 2023

(87) PCT Pub. No.: WO2022/033813
PCT Pub. Date: Feb. 17, 2022

(65) Prior Publication Data
US 2024/0039018 A1 Feb. 1, 2024

(30) Foreign Application Priority Data
Aug. 13, 2020 (DE) ............... 10 2020 210 323.2

(51) Int. Cl.
*F16K 1/20* (2006.01)
*F16K 1/24* (2006.01)
*H01M 8/04082* (2016.01)

(52) U.S. Cl.
CPC ....... *H01M 8/04201* (2013.01); *F16K 1/2007* (2013.01); *F16K 1/24* (2013.01)

(58) Field of Classification Search
CPC ..... F16K 1/24; F16K 1/2007; H01M 8/04201
See application file for complete search history.

(56) References Cited

U.S. PATENT DOCUMENTS 1,904,467 A * 4/1933 Karnath ............... F16K 1/24
251/167
3,065,950 A 11/1962 Goldberg
(Continued)

FOREIGN PATENT DOCUMENTS

DE 102017215260 A1 2/2019
EP 0320490 A2 6/1989

OTHER PUBLICATIONS

Translation of International Search Report for Application No. PCT/EP2021/070125 dated Oct. 25, 2021 (2 pages).

*Primary Examiner* — Reinaldo Sanchez-Medina
(74) *Attorney, Agent, or Firm* — Michael Best & Friedrich LLP

(57) ABSTRACT

The invention relates to a valve (10) for regulating oxygen in a fuel cell system (11), comprising: —a valve housing (12), which has a valve seat (13) and a through-opening (14) in the valve seat (13); —a valve shaft (15), which has a valve disk (16) formed thereon for closing the through-opening (14) in the valve seat (13) in a closed state of the valve (10) and for releasing the through-opening (14) in a released state of the valve (10); and—a moving means (17) for linearly moving the valve disk (16) between an opening position in an open state, in which open state the valve disk (16) is spaced apart from the valve seat (13), and a closing position in the closed state, in which closed state the valve disk (16) is positioned on the valve seat (13), and for rotationally moving the valve shaft (15) in order to pivot the valve disk (16) between the opening position and a releasing position in the released state, in which released state at least part of the valve disk (16) is spaced farther apart from the valve seat (13) than in the opening position. The invention also relates to a fuel cell system (11) comprising at least one valve (10) according to the invention.

18 Claims, 4 Drawing Sheets

(56) References Cited

U.S. PATENT DOCUMENTS

| | | | | |
|---|---|---|---|---|
| 3,498,583 | A * | 3/1970 | Friedell | F16K 1/24 251/188 |
| 4,770,392 | A * | 9/1988 | Schmidt | F16K 1/221 251/303 |
| 5,330,157 | A * | 7/1994 | Dern | F16K 1/24 251/162 |
| 2006/0226388 | A1 * | 10/2006 | Hiroki | F16K 1/24 251/204 |
| 2018/0274683 | A1 * | 9/2018 | Suzuki | F16K 1/24 |
| 2019/0056032 | A1 * | 2/2019 | Yoshioka | F16K 1/2028 |

* cited by examiner

FUEL CELL SYSTEM AND VALVE FOR REGULATING OXYGEN IN A FUEL CELL SYSTEM

BACKGROUND

The present invention relates to a valve for regulating oxygen in a fuel cell system, comprising a valve housing with a valve seat and a through-opening in the valve seat, and a valve shaft with a valve disk formed thereon for closing the through-opening in the valve seat in a closed state of the valve and for releasing the through-opening in a released state of the valve. The invention also relates to a fuel cell system comprising such a valve.

Valves of this type are used in a fuel cell system in conjunction with an air supply system to regulate the oxygen or air supply to a fuel cell stack of the fuel cell system. The valves are an important component of a protection system for preventing excessive oxygen or air supply to the fuel cell stack, for example when shutting down and/or stopping the fuel cell system. During the operation of the fuel cell system, the valves are responsible for supplying oxygen to the fuel cell stack, and in the switched-off and/or deactivated state of the fuel cell system, it is to be ensured by means of the valves that no oxygen or as little oxygen as possible reaches the fuel cell stack.

In known fuel cell systems, simple adjusting or blocking valves are generally used, in which the valve disk is pressed along a linear movement onto the valve seat in order to switch the valve to the closed state, and in which the valve disk is spaced apart from the valve seat along an opposite linear movement in order to switch the valve to the released state. These valves must execute a long linear stroke to realize a small pressure drop, in order to release a sufficient flow cross-section. This leads to a large installation space, in particular for a valve having a large nominal diameter.

For regulating oxygen in known fuel cell systems, butterfly valves and/or corresponding throttle flaps are also known. The advantage of this type of valve is that the valve, in a released position, releases a large line cross-section. In addition, these valves can be constructed relatively compactly. However, during operation of these valves, large shear stresses act on the seals used. This leads to contamination of the air circuit by friction particles and to a relatively short product life. Moreover, it is difficult and/or expensive to produce butterfly valves with a high degree of tightness.

SUMMARY

In the context of the present invention, an improved valve and a fuel cell system with such a valve are now provided. In particular, a valve and an associated fuel cell system are proposed. Features described in connection with the valve will of course also apply in connection with the fuel cell system according to the invention, and vice versa, so that, with respect to the disclosure of the individual aspects of the invention, reference is and/or can mutually be made in all cases.

According to a first aspect of the present invention, a valve for regulating oxygen in a fuel cell system is provided. The valve has a valve housing with a valve seat and a through-opening in the valve seat, and a valve shaft with a valve disk formed thereon for closing the through-opening in the valve seat in a closed state of the valve and for releasing the through-opening in a released state of the valve. The valve also comprises a moving means for linearly moving the valve disk between an opening position in an open state, in which the valve disk is spaced apart from the valve seat, and a closing position in the closed state, in which the valve disk is positioned on the valve seat, and for rotationally moving the valve shaft in order to pivot the valve disk between the opening position and a releasing position in the released state, in which at least part of the valve disk is spaced farther apart from the valve seat than in the opening position.

Due to the combination of linear movement and pivoting movement by means of the moving means according to the invention, a relatively large cross-section through the through-opening can be created in the released state, and a high contact pressure by the valve disk on the valve seat for a correspondingly high sealing effect can be created in the closed state. Such a combination was hitherto not possible with known valves, at least with comparable cost and/or complexity outlay. Until now, in the case of valves of the generic type for regulating oxygen in fuel cell systems, the one or the other type of movement of the valve disk has always been the focus. In comparison to known butterfly valves, in which the valve disk or a throttle flap is rotated about a central axis and/or shaft, the valve disk is preferably pivoted by the proposed moving means by a pivot axle arranged decentrally with respect to the valve disk and/or spaced apart from the valve disk. That is to say, the valve can have a pivot axle positioned decentrally with respect to the valve disk and/or spaced apart from the valve disk, about which pivot axle the valve disk is positioned and/or formed so as to be pivotable between the open state or a corresponding opening position and the released state or a corresponding releasing position. As a result, the valve disk can be prevented from being positioned centrally in the through-opening in the released state and there resulting in turbulence of the fluid guided in the valve. Instead, the valve disk of the present valve can be pivoted into an edge region of the through-opening. By pivoting the valve disk to the released state or the releasing position, the already-existing opening region in the open state can be enlarged even further.

Regulating oxygen can be understood to mean the regulation of an oxygen-containing fluid, in particular air. The valve is accordingly configured and formed in particular for regulating air in a fuel cell system. The regulation can be understood to mean controlling and/or regulating the oxygen supply from an oxygen source to a fuel cell stack of the fuel cell system and/or controlling and/or regulating oxygen removal from the fuel cell stack back to the oxygen source and/or into the environment of the fuel cell stack.

The fact that the moving means is configured and formed for linearly moving the valve disk between the open state or an opening position and the closed state or a closing position can be understood to mean that the moving means is configured and formed for spacing the valve disk from the valve seat to release the through-opening and/or for adjusting the valve from the closed state to the open state and for positioning and/or pressing the valve disk onto the valve seat for closing the through-opening and/or for adjusting the valve from the open state to the closed state. The release of the through-opening can be understood to mean a spacing of the valve disk apart from the valve seat, whereby oxygen or oxygen-containing fluid, such as air, can flow through the through-opening. The closing of the through-opening can be understood to mean pressing the valve disk against the valve seat, whereby a flow of oxygen or of an oxygen-containing fluid, such as air, through the through-opening can be prevented.

The valve housing has a housing volume, the valve disk and the valve shaft being positioned in the housing volume. In particular, the valve shaft is preferably located completely in the housing volume and/or does not extend beyond an outer wall of the valve housing.

According to a further embodiment of the present invention, it is possible in a valve for the moving means to have a gear wheel and for the valve shaft to have a toothed rack section, the gear wheel engaging with the toothed rack section for the linear movement of the valve disk. A simple and cost-effective solution for implementing the desired linear movement can be provided in this way. Furthermore, such a solution can be realized in a space-saving manner. The valve can have a shaft on which the gear wheel is rotationally fixed and by which the gear wheel in the valve can be rotated. In order to rotate the gear wheel, the gear wheel can be operatively connected to a drive motor via the shaft. The toothed rack section is understood to mean a toothed section extending linearly and/or straight. The toothed rack section therefore does not necessarily have to be rod-shaped.

Furthermore, it is possible for the moving means to have, in a valve according to the invention, a base body for the rotational movement of the valve shaft, a guide means for guiding the valve shaft during the linear movement and for fixing the valve shaft during the rotational movement, and a locking means for locking the gear wheel on the base body for the rotational movement. The linear movement and the rotational movement can thus be realized in a space-saving manner and with simple mechanical means. The base body and the valve shaft can each have a plate-shaped design and be designed to be on one another, in particular directly on one another, and/or flush in contact with one another. An outer surface of the base body and an outer surface of the valve shaft can be arranged parallel to one another. The guide means can have a plurality of guide elements spaced apart from one another. Particularly preferably, the guide means has four guide pins which span an imaginary rectangle. The spacing between two guide pin pairs in each case preferably corresponds to a width or slightly more than a width of the valve shaft. The fixing of the valve shaft during the rotational movement can be understood to mean preventing a movement of the valve shaft relative to the base body and/or to the gear wheel during the rotational movement.

Furthermore, it is possible in a valve according to the present invention for the locking means to be pin-shaped. The locking means can thus be formed in a particularly space-saving and cost-effective manner in the valve. The locking means preferably extends in a projection-like manner from a side face of the gear wheel parallel to the above-described pivot axle and/or parallel to an axis of rotation of the shaft described above. That is to say, a longitudinal axis of the locking means can extend parallel to and/or spaced apart from an axis of rotation of the gear wheel. For locking the gear wheel, the locking means is preferably displaceable back and forth in the longitudinal direction of the locking means and/or in a longitudinal direction of the above-described pivot axle. For this purpose, the valve can have a displacement means for displacing, in particular for automatically displacing, the locking means along the longitudinal direction of the locking means in order to lock the gear wheel on the base body for the rotational movement. The shaft described above can extend at least through part of a through-opening of the base body. The gear wheel can also be arranged in the through-opening. The valve can thus be of particularly compact design.

In addition, the guide means can protrude from the base body in a projection-like manner in a valve according to the present invention. The guide means has in particular a plurality of guide pins which are spaced apart from one another and protrude in a projection-like manner from an outer surface of a base body of the moving means. The guide means can thus be realized in a simple and correspondingly cost-effective manner. The guide means is preferably fastened to the base body. In particular, the guide means, for example in the form of the plurality of guide pins, can be designed as an integral and/or monolithic component of the base body.

According to a further embodiment variant of the present invention, the moving means can be configured in a valve for rotationally moving the valve shaft in order to pivot the valve disk in a range between 30° and a maximum of 180°. This limitation can prevent overrotation of the valve disk and thus damage to and/or in the valve. In particular, the moving means can be configured and formed in a valve for rotationally moving the valve shaft in order to pivot the valve disk in a range between 80° and a maximum of 100°. According to a preferred development, the valve can have a blocking means for blocking the rotational movement of the valve disk in the closing position of the valve disk. Thus, both overrotation, or excessive pivoting, of the valve disk beyond the maximum pivot angle and accidental rotation of the valve disk when the valve disk is still located on the valve seat can be prevented. Consequently, increased operational safety for the valve can be provided by the blocking means. Furthermore, stable positioning of the valve disk on the valve seat when the valve is in the closed state can be provided by the blocking means. The blocking means is preferably configured and formed for blocking the rotational movement in the closed state of the valve disk and, at the same time, for enabling the linear movement.

Furthermore, in a valve according to the invention, a blocking means receptacle can be formed on the valve shaft for a non-positive and/or positive connection to the blocking means for blocking the rotational movement. The functions described above for the blocking means can thus be further improved. In particular, the valve disk can thus be held in a particularly secure manner on the valve seat in the closed state. The blocking means receptacle can be formed as an undercut, groove, channel, and/or recess in and/or on the valve shaft. A guide surface with a guide radius for inserting the blocking means into the blocking means receptacle during the pivoting of the valve disk can be formed on the blocking means receptacle.

According to a further embodiment variant of the present invention, it is possible for at least part of the valve disk to extend through a valve seat plane and into the through-opening in a valve in the released state. The valve disk can thus be used as an effective fluid-conducting surface for improved conduction of the oxygen and/or of the oxygen-containing fluid through the valve housing. The valve disk can thus perform a corresponding dual function. At least part of the valve disk extending through a valve seat plane and into the through-opening in a valve in the released state can be understood to mean that in a released state in which the valve shaft is rotated and the valve disk is pivoted maximally in order to create as large a through-opening as possible or as large a fluid through-flow cross-section as possible, at least part of the valve disk extends through the valve seat plane into the through-opening and/or away from the moving means beyond the valve seat plane.

According to a further aspect of the present invention, a fuel cell system with a fuel cell stack, an oxygen source, and at least one valve as described in detail above for regulating the oxygen transport between the fuel cell stack and the oxygen source is provided. The fuel cell system according to the invention thus provides the same advantages as have been described in detail with reference to the valve according to the invention. The fuel cell system in particular has two of the valves in question, wherein one valve is provided for an oxygen supply from the oxygen source to the fuel cell stack and the other valve is provided for oxygen removal from the fuel cell stack to the oxygen source.

Further measures improving the invention result from the following description of various exemplary embodiments of the invention, which are schematically illustrated in the figures. All features and/or advantages arising from the claims, the description or the figures, including structural details and spatial arrangements, can be essential to the invention both by themselves and in the various combinations.

BRIEF DESCRIPTION OF THE DRAWINGS

The figures respectively show schematically.

Elements having the same function and manner of operation are respectively provided with the same reference symbols in the figures.

DETAILED DESCRIPTION

Figure 1:
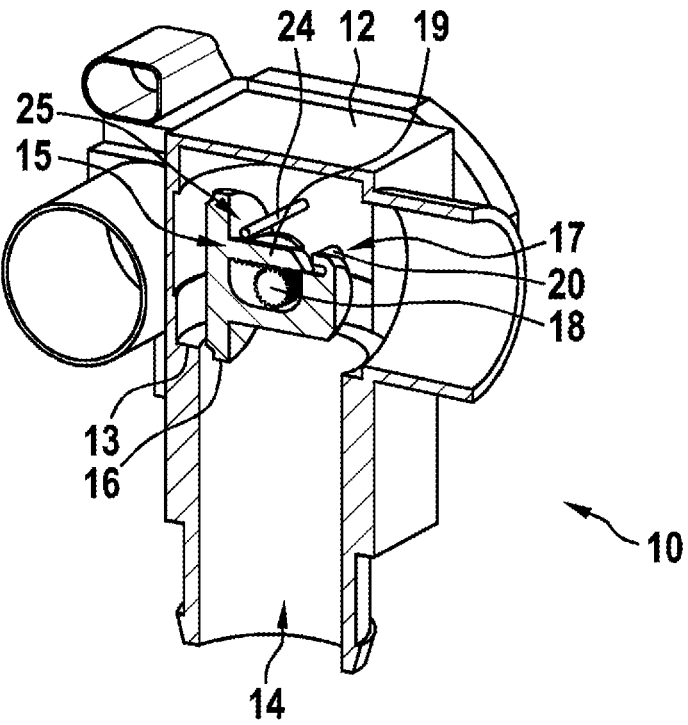
FIG. 1 a perspective view of a valve according to a first embodiment of the present invention in a released state, FIG. 2 a perspective view of a valve according to the first embodiment of the present invention in a closed state, FIGS. 3 to 6 sectional views for explaining an adjustment process for adjusting a valve according to the invention from the closed state to the released state and from the released state to the closed state, and FIG. 7 a block diagram illustrating a fuel cell system according to the invention.
Figure 7:
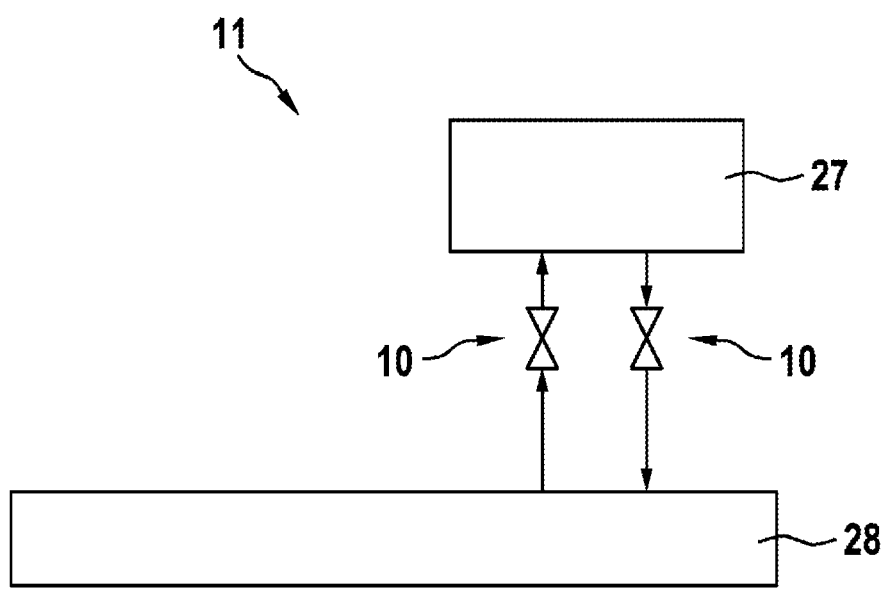

FIG. 1 shows a valve 10 for regulating oxygen in a fuel cell system 11 shown in FIG. 7 according to a preferred embodiment. The valve 10 shown has a valve housing 12 with a valve seat 13 and a through-opening 14 in the valve seat 13. The valve 10 furthermore comprises a valve shaft 15 with a valve disk 16 formed thereon for closing the through-opening 14 in the valve seat 13 in a closed state of the valve 10 and for releasing the through-opening 14 in a released state of the valve 10. In addition, the valve 10 comprises a moving means 17 for linearly moving the valve disk 16 between an opening position in an open state, in which the valve disk 16 is spaced apart from the valve seat 13, and a closing position in the closed state, in which the valve disk 16 is positioned on the valve seat 13, and for rotationally moving the valve shaft 15 in order to pivot the valve disk 16 between the opening position and a releasing position in the released state, in which at least part of the valve disk 16 is spaced farther apart from the valve seat 13 than in the opening position. The valve 10 shown also has a gear wheel 18 which is fastened to a shaft 20.

Figure 2:
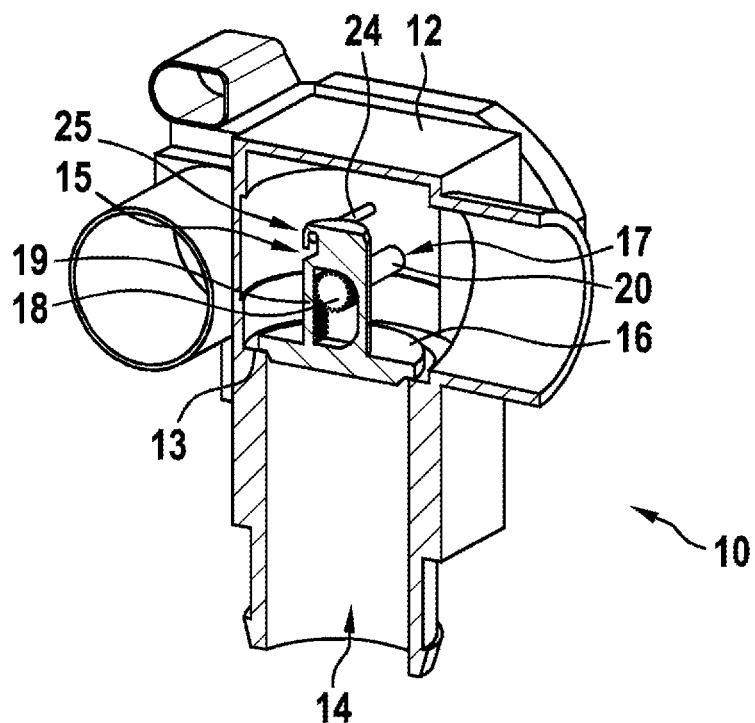

The valve 10 shown in FIG. 1 is in the released state, in which the valve disk 16 is in the releasing position, i.e., spaced apart from the valve seat 13. The valve 10 shown in FIG. 2 is in the closed state, in which the valve disk 16 is in the closing position, i.e., on the valve seat 13.

With reference to FIGS. 3 to 6, two different adjustment processes are now described. First, an adjustment of the valve 10 from the closed state to the released state and then an adjustment of the valve 10 from the released state back to the closed state.

Figure 3:
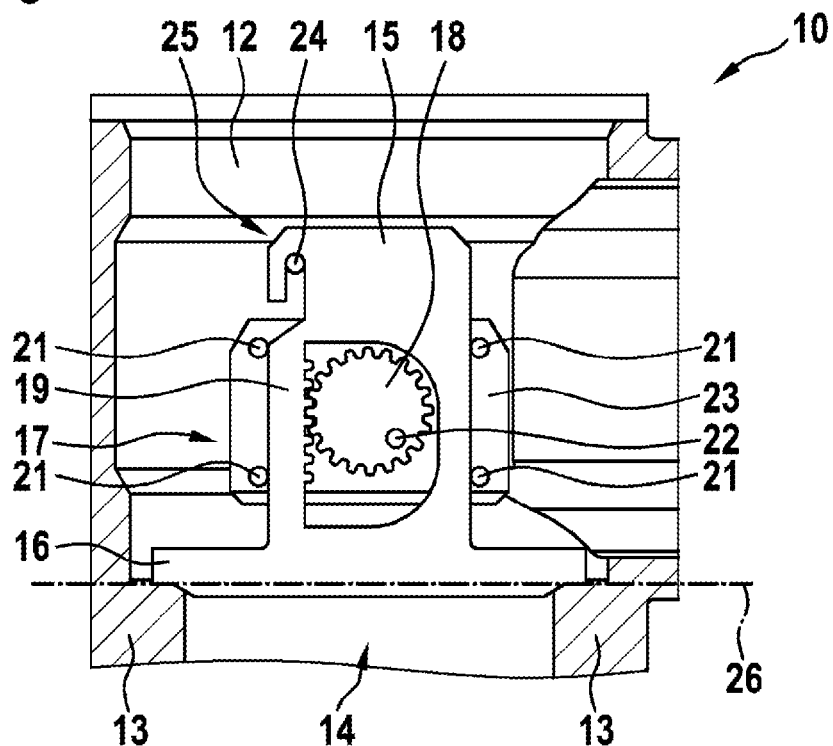

In FIG. 3, the valve 10 is in the closed state. As can also be seen in FIG. 3, the moving means 17 has a gear wheel 18 and the valve shaft 15 has a toothed rack section 19, the gear wheel 18 engaging with the toothed rack section 19 for the linear movement of the valve disk 16. The moving means 17 furthermore comprises a base body 23 for the rotational movement of the valve shaft 15, a guide means 21 with four guide pins for guiding the valve shaft 15 during the linear movement and for fixing the valve shaft 15 during the rotational movement, and a pin-shaped locking means 22 for locking the gear wheel 18 on the base body 23 for the rotational movement. Furthermore, the valve 10 has a pin-shaped blocking means 24 for blocking the rotational movement of the valve disk 16 in the closing position of the valve disk 16. In addition, on the valve shaft 15, a blocking means receptacle 25 is formed in the form of an undercut with a guide surface with a curved radius for a non-positive and positive connection with the blocking means 24 for blocking the rotational movement.

Figure 4:
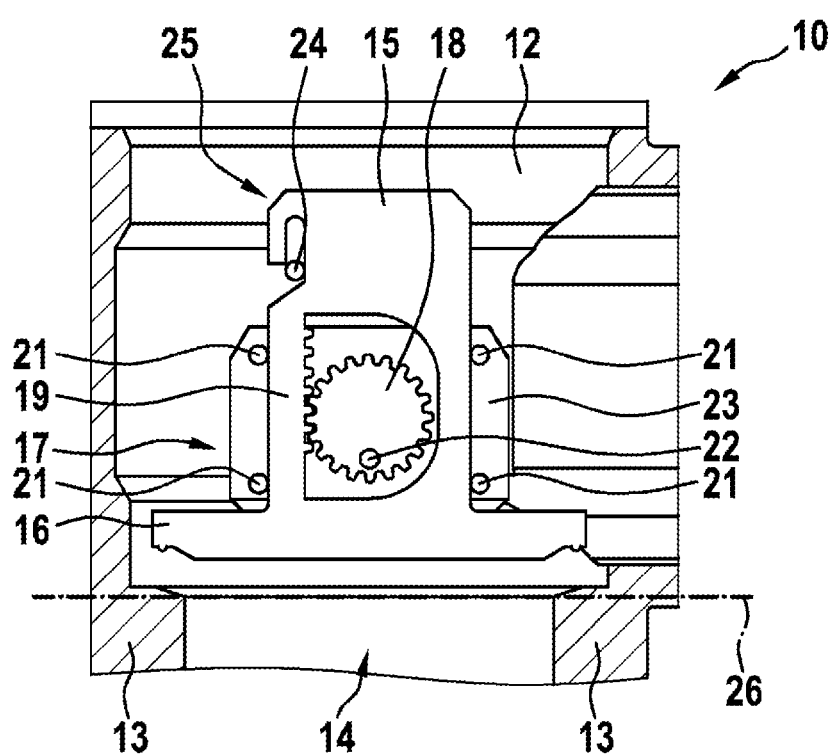
Figure 5:
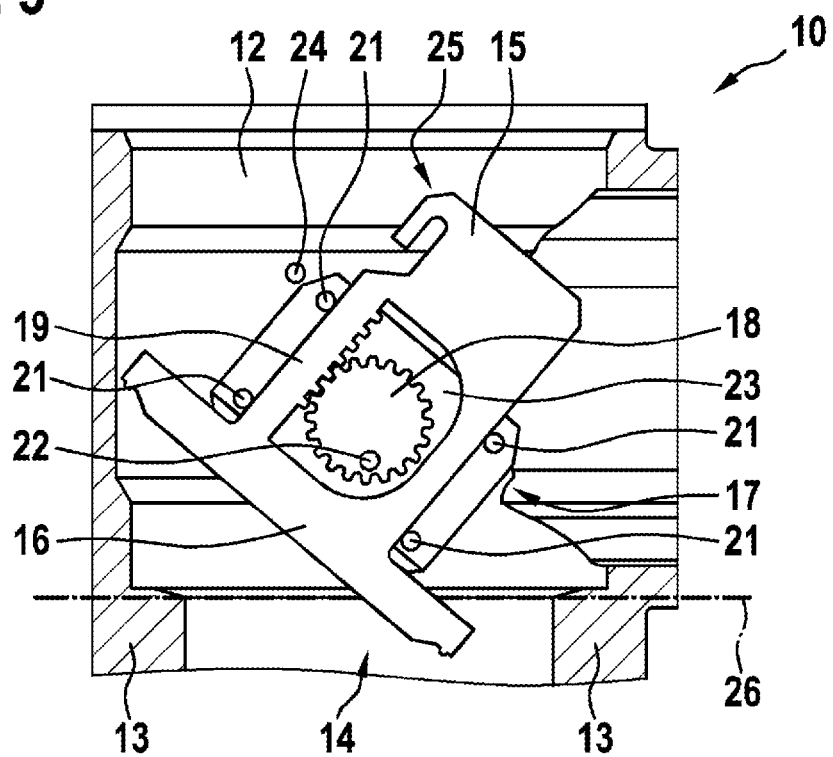
Figure 6:
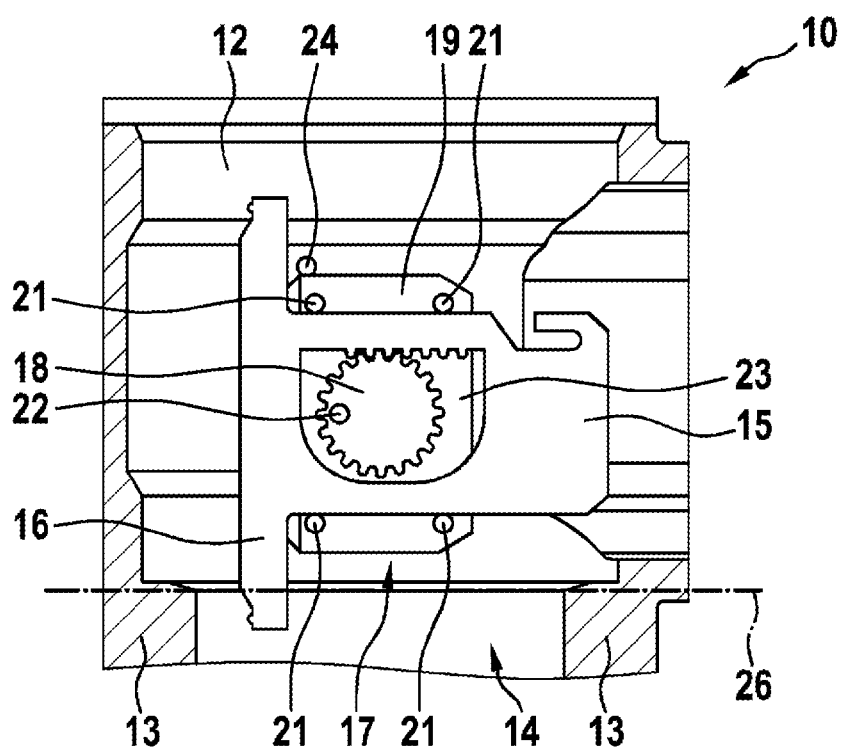

In order to adjust the valve 10 to the open state, the valve disk 16, as shown in FIG. 4, is initially lifted from the valve seat 13 by rotating the gear wheel 18. That is to say, the valve disk 16 is moved linearly from the closing position shown in FIG. 3 into the opening position shown in FIG. 4. In the process, the blocking means 24 is moved out of the blocking means receptacle 25, or the blocking means receptacle 25 is moved by the blocking means 24, in order to release the valve shaft 15 for the rotational movement of the valve shaft 15. The gear wheel 18 is now fixed to the base body 23 by the locking means 22. The base body 23, which has up to now been only loosely mounted on the shaft 20, can now likewise be rotated by the shaft. By rotating the shaft 20, in particular by means of a drive motor, not only are the gear wheel 18 and the base body 23 rotated, but the valve shaft 15 is also rotated via the guide means 21, and the valve disk 16, as shown in FIG. 5, is thus pivoted by approximately 90° from the opening position into the releasing position. The ultimately achieved released state of the valve is shown in FIG. 6. As shown in FIG. 6, in the released state, part of the valve disk 16 extends through a valve seat plane 26 and into the through-opening 14.

If the valve 10 is now to be adjusted again to the closed state, the valve disk 16 is first pivoted out of the releasing position back into the opening position until the valve shaft 15 abuts and/or comes to rest on the blocking means 24 in a stop position of the valve shaft 15. Now, when the gear wheel 18 is rotated further via the shaft 20, the locking means 22 for the linear movement is pressed against an edge or a mating surface of the base body 23 and, as a result, the locking means 22 is released from the base body 23, i.e., the mechanical connection between the base body 23 and the gear wheel 18 due to the locking means 22 is removed by linearly moving the locking means 22 in a longitudinal direction of the locking means 22. The gear wheel 18 is then rotated via the shaft 20 and the drive motor, resulting in a linear movement of the valve disk 16 from the opening position back into the closing position. In the process, the blocking means 24 moves back into the blocking means receptacle 25.

FIG. 7 shows a fuel cell system 11 with a fuel cell stack 27, an oxygen source 28, and two valves 10, as described in detail above, for regulating the oxygen transport between the fuel cell stack 27 and the oxygen source 28. The one valve 10 is provided as an inlet valve for the controlled supply of oxygen-containing fluid, in particular air, to the fuel cell stack 27, and the other valve 10 is provided as an outlet valve for the controlled discharge of oxygen-containing fluid from the fuel cell stack 27.

In addition to the illustrated embodiments, further design principles of the invention are possible. That is to say, the invention is not to be limited to the exemplary embodiments explained with reference to the figures.

What is claimed is:

1. A valve (10) for regulating oxygen in a fuel cell system (11), the valve comprising a valve housing (12) with a valve seat (13) and a through-opening (14) in the valve seat (13), and a valve shaft (15) with a valve disk (16) formed thereon for closing the through-opening (14) in the valve seat (13) in a closed state of the valve (10) and for releasing the through-opening (14) in a released state of the valve (10), wherein
a moving means (17) for linearly moving the valve disk (16) between an opening position in an open state, in which the valve disk (16) is spaced apart from the valve seat (13), and a closing position in the closed state, in which the valve disk (16) is positioned on the valve seat (13), and for rotationally moving the valve shaft (15) in order to pivot the valve disk (16) between the opening position and a releasing position in the released state, in which at least part of the valve disk (16) is spaced farther apart from the valve seat (13) than in the opening position,
wherein the moving means (17) has
a base body (23) for the rotational movement of the valve shaft (15),
a guide means (21) for guiding the valve shaft (15) during the linear movement and for fixing the valve shaft (15) during the rotational movement, and
a locking means (22) for locking a gear wheel (18) on the base body (23) for the rotational movement,
wherein the locking means (22) includes a pin that extends from a side face of the gear wheel (18).

2. The valve (10) according to claim 1, wherein the moving means (17) has the gear wheel (18) and the valve shaft (15) has a toothed rack section (19), wherein the gear wheel (18) is in engagement with the toothed rack section (19) for the linear movement of the valve disk (16).

3. The valve (10) according to claim 1, wherein the guide means (21) protrudes from the base body (23) in a projection-like manner.

4. The valve (10) according to claim 1, wherein the moving means (17) is configured for rotationally moving the valve shaft (15) in order to pivot the valve disk (16) in a range between 30° and a maximum of 180°.

5. The valve (10) according to claim 1, further comprising a blocking means (24) for blocking the rotational movement of the valve disk (16) in the closing position of the valve disk (16).

6. The valve (10) according to claim 5, wherein a blocking means receptacle (25) is formed on the valve shaft (15) for a non-positive and/or positive connection with the blocking means (24) for blocking the rotational movement.

7. The valve (10) according to claim 1, wherein in the released state, at least part of the valve disk (16) extends through a valve seat plane (26) and into the through-opening (14).

8. A fuel cell system (11) with a fuel cell stack (27), an oxygen source (28) and at least one valve (10) according to claim 1 for regulating oxygen transport between the fuel cell stack (27) and the oxygen source (28).

9. The valve (10) according to claim 3, wherein the guide means (21) includes a plurality of guide elements spaced apart from one another.

10. The valve (10) according to claim 9, wherein the plurality of guide elements are four guide pins.

11. A valve (10) for regulating oxygen in a fuel cell system (11), the valve comprising a valve housing (12) with a valve seat (13) and a through-opening (14) in the valve seat (13), and a valve shaft (15) with a valve disk (16) formed thereon for closing the through-opening (14) in the valve seat (13) in a closed state of the valve (10) and for releasing the through-opening (14) in a released state of the valve (10),
wherein a moving means (17) for linearly moving the valve disk (16) between an opening position in an open state, in which the valve disk (16) is spaced apart from the valve seat (13), and a closing position in the closed state, in which the valve disk (16) is positioned on the valve seat (13), and for rotationally moving the valve shaft (15) in order to pivot the valve disk (16) between the opening position and a releasing position in the released state, in which at least part of the valve disk (16) is spaced farther apart from the valve seat (13) than in the opening position,
wherein the moving means (17) has
a base body (23) for the rotational movement of the valve shaft (15),
a guide means (21) for guiding the valve shaft (15) during the linear movement and for fixing the valve shaft (15) during the rotational movement, and
a locking means (22) for locking a gear wheel (18) on the base body (23) for the rotational movement,
wherein the guide means (21) includes a plurality of guide elements spaced apart from one another and protruding from the base body (23) in a projection-like manner.

12. The valve (10) according to claim 11, wherein the plurality of guide elements includes four guide pins.

13. The valve (10) according to claim 11, wherein the moving means (17) has the gear wheel (18) and the valve shaft (15) has a toothed rack section (19), wherein the gear wheel (18) is in engagement with the toothed rack section (19) for the linear movement of the valve disk (16).

14. The valve (10) according to claim 11, wherein the moving means (17) is configured for rotationally moving the valve shaft (15) in order to pivot the valve disk (16) in a range between 30° and a maximum of 180°.

15. The valve (10) according to claim 11, further comprising a blocking means (24) for blocking the rotational movement of the valve disk (16) in the closing position of the valve disk (16).

16. The valve (10) according to claim 15, wherein a blocking means receptacle (25) is formed on the valve shaft (15) for a non-positive and/or positive connection with the blocking means (24) for blocking the rotational movement.

17. The valve (10) according to claim 11, wherein in the released state, at least part of the valve disk (16) extends through a valve seat plane (26) and into the through-opening (14).

18. A fuel cell system (11) with a fuel cell stack (27), an oxygen source (28) and at least one valve (10) according to claim 11 for regulating oxygen transport between the fuel cell stack (27) and the oxygen source (28).

* * * * *